Patented Oct. 13, 1936

2,057,630

UNITED STATES PATENT OFFICE 2,057,630

TREATMENT OF HYDROCARBON OILS

Jacque C. Morrell and Gustav Egloff, Chicago, Ill., assignors, by mesne assignments, to Universal Oil Products Company, Chicago, Ill., a corporation of Delaware No Drawing. Application January 29, 1931, Serial No. 512,204. Renewed April 8, 1935

8 Claims. (Cl. 196—28)

This invention relates to the treatment of hydrocarbon oils, and refers more particularly to the refining of the relatively low boiling hydrocarbon distillates.

In one of its specific aspects the invention embodies a process for the refining of cracked hydrocarbon oils, and comprises subjecting such oils to treatment with hydrochloric acid and/or hydrogen chloride in the presence of a metallic oxide.

The invention has special application to the refining of the relatively low boiling hydrocarbon distillates in the vapor phase, and is particularly useful in the treatment in the vapor phase of the relatively low boiling products resulting from the conversion of hydrocarbon oils by subjecting the said vapors from the cracking process during or subsequent to fractionation to treatment with hydrochloric acid in the presence of a metallic oxide.

The usual method of refining cracked distillates is to subject them to treatment with sulphuric acid and alkaline solutions, including plumbite solutions consisting of litharge dissolved in alkaline solutions in various combinations of treatment and subsequently to subject the acid treated product to redistillation usually in the presence of steam. The present invention permits the direct treatment of the hydrocarbon vapors from the cracking process, reducing the cost of reagents and eliminating the redistillation or rerunning operation, although it is within the scope of the invention to revaporize the product from the cracking process in a subsequent operation and subject the vapors to treatment as described.

Among the metallic oxides which may be used and as examples thereof are the following: the oxides of calcium, magnesium, aluminum zinc, tin, iron, copper, lead, mercury, cobalt, nickel, chromium, manganese, molybdenum, vanadium, tungsten, and the like. It is within the scope of the present invention to employ mixtures of the metallic oxides. The results obtained vary in degree as a function of the oxide employed.

In applying the process of the invention to practice any suitable equipment may be employed which will permit the contacting of the hydrocarbon vapors and the hydrogen chloride with the metallic oxides; for example, a suitable tower or chamber packed with a selected oxide may be employed following the fractionator of a cracking system, feeding the hydrochloric acid solution directly to the tower counter-current to the flow of the hydrocarbon vapors, thus permitting contact of the hydrochloric acid and hydrocarbons to be treated with the metallic oxide from any suitable source, alone or in combination with steam, which may be introduced directly into the tower or treating vessel containing the metallic oxides. In lieu of direct packing of the tower or treating vessel with the metallic oxides an inert filling material such as Raschig rings, firebrick, crushed rock, gravel, crushed ceramic material, and the like, suitably coated with a metallic oxide, or a mixture of the same may be employed. Similarly, any device which permits the efficient contacting of the vapors undergoing treatment with the metallic oxide may be employed.

The tower or treating vessel containing the metallic oxides may be directly connected to a cracking unit or to a re-run or redistillation unit so that the vapors arising therefrom may be treated in the manner described.

It has been found desirable to neutralize the distillate immediately after condensation either by passing the condensate directly through a body of alkaline material such as a solution of caustic soda or by washing the distillate free of hydrogen chloride with water and/or alkalies, such as a solution of caustic soda, ammonia or the like. The neutralizing agent may also be introduced into the vapor line leading to the condenser or into the condenser itself. The amount of hydrochloric acid employed may vary from a fraction of one percent to 10 percent by volume, more or less, in concentrations of from 1% to 37%, more or less. Hydrogen chloride together with steam may also be employed.

Various temperatures of treatment may be employed; for example, from 250–600° F. more or less, and the pressures may be subatmospheric, atmospheric, or superatmospheric. While the results may vary with the temperatures employed, the pressures and temperatures are chosen so that the hydrocarbons are treated substantially in the vapor phase.

As specific examples of the operation of the process of my invention and of the results obtained, a California cracked distillate of approximately motor fuel boiling range was vaporized and subjected to treatment with hydrochloric acid in the presence of zinc oxide. The vapors were passed at a suitable rate through the tower containing the zinc oxide and approximately one pound per barrel of hydrogen chloride in the form of a 5% solution in water was introduced into the tower countercurrent to the flow of the vapors. The untreated product showed a gum content of approximately 500 mgs. per 100 ccs. and was a reddish brown color. The sulphur content was approximately 0.20. The treated product showed a gum content of approximately 18 mgs. per 100 ccs. and had a color of plus 30 on the Saybolt colorimeter scale. The sulphur content was reduced to approximately 0.17. The gum determinations are made by the copper dish method.

When the zinc oxide was distributed over pumice stone similar results to those just described were obtained.

A mixed Mid-Continent and West Texas cracked distillate when treated in the vapor phase with hydrochloric acid employing zinc oxide as a contacting agent gives the following results: the untreated distillate shows a gum content of approximately 300 mgs. per 100 ccs. and a light amber color. The treated distillate may be reduced in gum content to approximately 11 mgs. per 100 ccs. and has a color of approximately 30 on the Saybolt colorimeter scale. The sulphur content may be reduced also.

A California cracked distillate when treated with approximately ¾ of a pound of hydrogen chloride per barrel of distillate in the form of 3% solution in water in the presence of tin oxide shows the following results:

The untreated distillate contains approximately 600 mgs. of gum per 100 ccs. The treated distillate may contain approximately 50 mgs. per 100 ccs. The untreated distillate is a dark reddish amber in color, and the treated distillate may have a color from 25 to 30 on the Saybolt colorimeter scale. The sulphur content is quite appreciably reduced.

With a Mid-Continent distillate containing approximately 350 mgs. of gum per 100 ccs. and having a dark yellow color one may obtain a product containing approximately 25 mgs. of gum per 100 ccs. having a color of approximately 25–30 on the Saybolt colorimeter scale and with an appreciable reduction in sulphur content by treatment with hydrogen chloride employing approximately one-third of a pound per barrel, based on the distillate treated, in the form of a 10% solution of the hydrogen chloride in water using zinc oxide as a contacting agent. Similar results may be obtained by employing hydrogen chloride gas and steam.

Distillates containing several hundred mgs. of gum per 100 ccs. more or less, and of a dark color, from various sources such as those from West Texas, California, Mid-Continent, Pennsylvania, and the like, may be treated in the presence of metallic oxides with approximately one-half to several pounds of hydrogen chloride per barrel of distillate in the form of an aqueous solution to produce marketable products of low gum content, good color, odor and stability. The results obtained vary in degree as a function of the oxides employed.

The above examples are only illustrative and should not be construed as restrictions or limitations on the broad scope of the invention.

The treatment herein described may constitute the sole refining action on the oil, or it may constitute one step in a series of refining steps. It may be preceded by the usual treatments with refining agents such as sulphuric acid, caustic soda, plumbite, filtering earth or the like, and may be succeeded by any combination of the above refining agents, followed, if desired, by distillation.

We claim as our invention:

1. A step in a process of desulphurizing hydrocarbon oil, which comprises subjecting sulphur-containing hydrocarbon oil in the vapor phase to treatment at below cracking temperature with added aqueous hydrochloric acid solution as the principal refining agent and an oxide of a heavy metal.

2. A step in a process of purifying the overhead product of gasoline boiling range resulting from the cracking of hydrocarbon oil, which comprises subjecting said product while in vaporous condition to treatment at below cracking temperature with added aqueous hydrochloric acid solution as the principal refining agent and an oxide of a heavy metal.

3. A step in a process of purifying the overhead product of gasoline boiling range resulting from the cracking of hydrocarbon oil, which comprises subjecting said product while in vaporous condition to treatment at below cracking temperature simultaneously with added aqueous hydrochloric acid solution as the principal refining agent and an oxide of a heavy metal.

4. A step in a process of desulphurizing hydrocarbon oil, which comprises subjecting sulphur-containing hydrocarbon oil in the vapor phase to treatment at below cracking temperature with added aqueous hydrochloric acid solution as the principal refining agent and an oxide of zinc.

5. In the desulphurizing of hydrocarbon oils, the step which comprises subjecting sulphur-containing hydrocarbon oil at a temperature of from 250° F. to 600° F. to treatment with added aqueous hydrochloric acid solution as the principal refining agent and an oxide of a heavy metal.

6. In the purifying of the overhead product of gasoline boiling range resulting from the cracking of hydrocarbon oil, the step which comprises subjecting said product at a temperature of from 250° F. to 600° F. to treatment with added aqueous hydrochloric acid solution as the principal refining agent and an oxide of a heavy metal.

7. In the purifying of the overhead product of gasoline boiling range resulting from the cracking of hydrocarbon oil, the step which comprises subjecting said product at a temperature of from 250° F. to 600° F. to treatment with added aqueous hydrochloric acid solution as the principal refining agent in the presence of an oxide of a heavy metal.

8. In the purifying of the overhead product of gasoline boiling range resulting from the cracking of hydrocarbon oil, the step which comprises subjecting said product at a temperature of from 250° F. to 600° F. to treatment with added aqueous hydrochloric acid solution as the principal refining agent in the presence of an oxide of zinc.

JACQUE C. MORRELL.
GUSTAV EGLOFF.